United States Patent [19]
Dunfield et al.

[11] Patent Number: 5,600,511
[45] Date of Patent: Feb. 4, 1997

[54] PARTICLE CONTAINMENT AND FLUID RETENTION WITH BARRIER SEAL IN MAGNETIC DISC DRIVE

[75] Inventors: John C. Dunfield, Santa Cruz; Gunter K. Heine, Aptos, both of Calif.

[73] Assignee: Seagate Technology, Inc., Scotts Valley, Calif.

[21] Appl. No.: 386,882

[22] Filed: Feb. 10, 1995

[51] Int. Cl.$^6$ .............................. G11B 33/14; G11B 17/02
[52] U.S. Cl. .................................. 360/97.02; 360/38.07; 360/99.08
[58] Field of Search .............................. 360/98.07, 99.04, 360/99.08, 37.02

[56] References Cited

U.S. PATENT DOCUMENTS

| | | | |
|---|---|---|---|
| 4,779,165 | 10/1988 | Elsaesser et al. | 360/97 |
| 5,011,165 | 4/1991 | Cap | 277/80 |
| 5,267,737 | 12/1993 | Cossette et al. | 277/80 |
| 5,284,391 | 2/1994 | Diel | 360/99.12 |
| 5,367,416 | 11/1994 | Cossette et al. | 360/97.02 |

OTHER PUBLICATIONS

Data Sheet, "Solving Design Problems with Synthetic Lubricants," published by Nye Lubricants, Inc., P.O. Box 8928, New Bedford, MA 02742 (undated), pp. 1–3.

*Primary Examiner*—A. J. Heinz
*Attorney, Agent, or Firm*—Westman, Champlin & Kelly, P.A.

[57] ABSTRACT

A disc drive includes a disc drive motor for rotating a magnetic storage disc. The disc drive includes a sealed disc drive chassis which provides a substantially contaminant-free cavity. A fixed member is coupled to the disc drive chassis and a rotor is rotatably about the fixed member for carrying a magnetic storage disc in the contaminant-free cavity. A bearing assembly between the rotor and fixed member allows rotation of the rotor relative to the fixed member. A gap defined between the rotor and the fixed member separates the bearing assembly from the contaminant-free environment and the magnetic storage disc. A barrier material in the gap has a characteristic which reduces contaminant flow thereby. The barrier material tends to prevent liquid and particulate contaminants from escaping from the drive motor and entering the sealed cavity.

20 Claims, 4 Drawing Sheets

PARTICLE CONTAINMENT AND FLUID RETENTION WITH BARRIER SEAL IN MAGNETIC DISC DRIVE

BACKGROUND OF THE INVENTION

The present invention relates generally to the field if disc drive data storage devices. More specifically, the invention relates to reducing contaminants in a housing of a magnetic disc drive.

Disc drive data storage devices are well known in the industry. Such devices use rigid discs coated with a magnetizable medium for storage of digital information in a plurality of circular concentric tracks. This information is written to and read from the discs using a transducing head mounted on an actuator mechanism which moves the head from track to track across a surface of the disc under the control of electronic circuitry. The discs are mounted for rotation on a spindle motor which causes the discs to spin and the surface of the discs to pass under the heads.

As magnetic storage densities have increased, magnetic disc drives have been required to operate with increasingly greater precision. This requirement has meant that magnetic recording heads have been placed increasingly close to the surface of the magnetic disc. The interaction between the magnetic head and the recording surface has also become increasingly precise. This has required the environment of the magnetic disc to be free from particulate and liquid contaminants. Typically, the disc environment is sealed during manufacture so that contaminants cannot enter the housing and contact the storage disc or the magnetic recording head. Additionally, it is important that the disc environment within the chassis remain contaminant free following manufacturing and during operation of the disc drive system. Even minute contaminants can have catastrophic results on disc operation. For example, particulate buildup between the transducing head and the disc can cause degradation in the readback signal, head crashes and damage to the disc surface.

One source of particulate and liquid contaminants in the sealed chassis is the disc drive spindle motor which rotates the storage disc. The disc rotates at speeds in excess of several thousands of RPM. The motor is sealed, and the magnetic disc and the rotor which support the magnetic disc are rotatably coupled to a fixed member of the motor, but the seal is not perfect and contaminants tend to escape from the motor into the sealed chassis. The prior art shows a number of attempts to reduce this tendency. For example, U.S. Pat. No. 5,011,165, issued Apr. 30, 1994, to Cap, entitled "SEALING DEVICE ESPECIALLY FOR HARD DISK DRIVES," describes a ferrofluid seal which is used to isolate the environment of the drive motor from the sealed disc environment. The ferrofluid seal is a fluidic seal made of a ferrofluid which is held in place by a magnet. The fluid extends across a gap between a fixed portion of the disc drive motor and the rotor, and thereby prevents contaminants from the motor from entering the sealed environment. However, one problem with the ferrofluid seal is that the ferrofluid may tend to leak from the seal and enter the disc environment which leads to the problems discussed above. Further, fluid from the ferrofluid seal may leak into the motor which may cause damage. Additionally, leakage of ferrofluid reduces the effective quantity of ferrofluid in the seal thereby reducing the effectiveness of the seal.

Another type of seal is a "labyrinth" seal. Typically, a labyrinth seal is a small gap at a small diameter of the motor which extends over a long path. This arrangement tends to inhibit contaminants from the motor from escaping through labyrinth into the sealed disc environment. It can be seen that the labyrinth seal can be made more effective by reducing the gap and lengthening the path. However, this requires precision machining which is both difficult, time consuming and expensive. Although labyrinth seals tend to be less expensive than ferrofluid seals, labyrinth seals are typically not as effective in isolating the motor from the disc environment. Further, some of ferrofluid in a ferrofluid seal may leak from the region of the magnet.

There is a continual need for improving the isolation between the motor and the contaminant-free disc environment.

SUMMARY OF THE INVENTION

A disc drive motor relates to a magnetic storage disc in a magnetic disc drive for storing information. The storage disc is housed in a sealed disc drive chassis which provides a contaminant-free cavity. A fixed member of the motor is coupled to the disc drive chassis. A rotor is rotatable about the fixed member and carries the magnetic storage disc in the contaminant-free cavity. A bearing assembly between the rotor and the fixed member allows rotation of the rotor relative to the fixed member. A gap defined between the rotor and the fixed member separates the bearing assembly from the contaminant-free environment and the magnetic storage disc. The gap contains a barrier material having a characteristic which reduces fluid and particulate contaminant flow thereby. This reduces contaminants entering the cavity from the motor and bearing assembly.

In one embodiment, the gap includes a labyrinth seal. In another embodiment, the gap includes a ferrofluid seal and the barrier material reduces leakage of ferrofluid from the ferrofluid seal.

In one embodiment, the barrier material comprises a fluorocarbon polymer which has a surface energy below a surface tension of a lubricant used in the bearing assembly.

In another embodiment, the motor includes a ferrofluid seal and barrier material is applied proximate the seal. The barrier material is positioned to reduce flow of ferrofluid away from the ferrofluid seal. The barrier material may be positioned to reduce ferrofluid flow both in a direction toward the contaminant-free cavity or toward the inner workings of the motor.

DETAILED DESCRIPTION OF THE PREFERRED EMBODIMENTS

Figure 1:
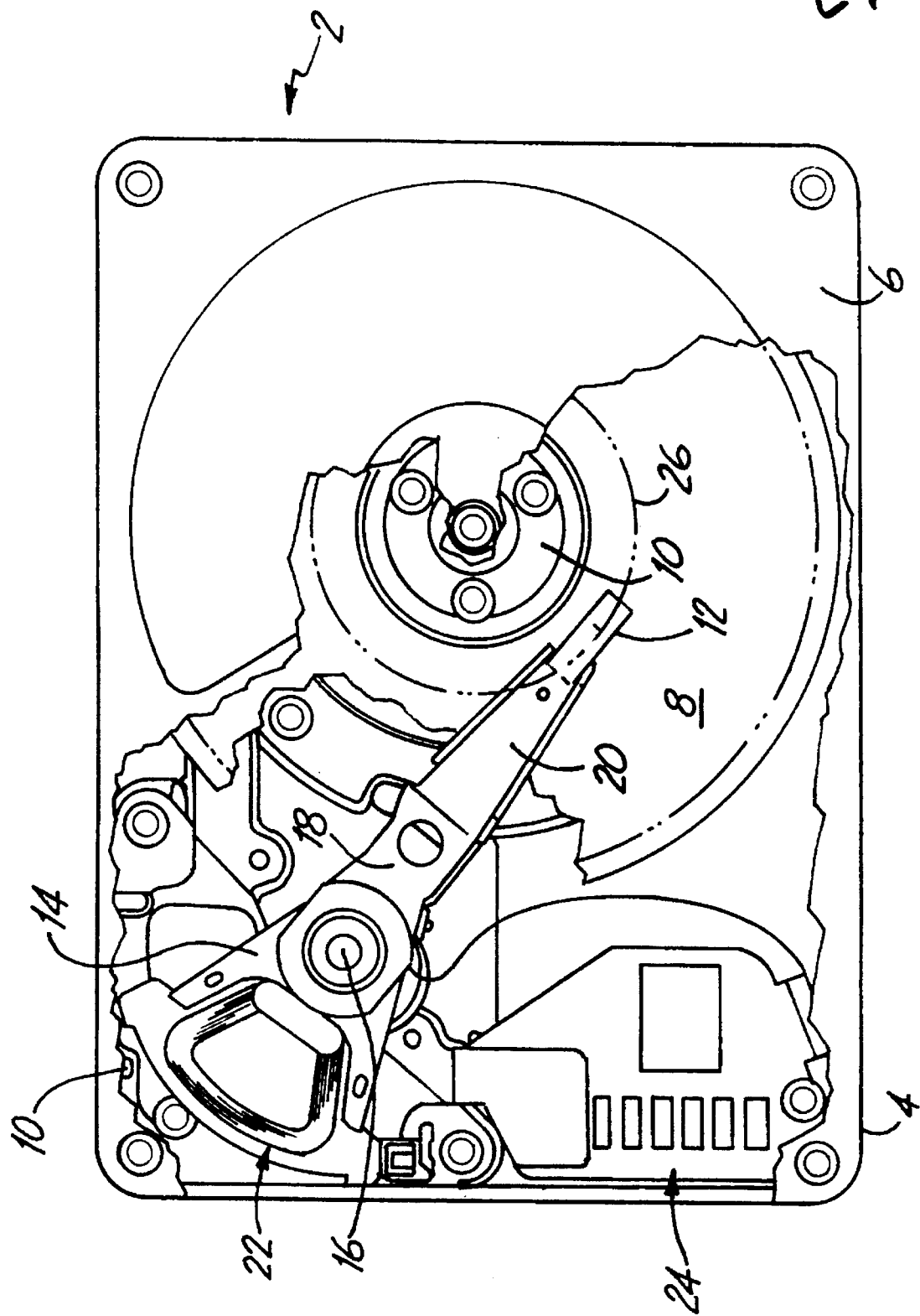
FIG. 1 is a plan view of a disc drive data storage device in which the present invention is useful.

FIG. 1 shows a plan view of a disc drive 2 for use with the present invention. Disc drive 2 includes a base member 4 to which internal components of the unit are mounted. Base member 4 couples to top cover 6 which forms a sealed environment (cavity) for critical parts of disc drive 2.

Disc drive 2 includes a plurality of discs 8 which are mounted for rotation on a spindle motor, shown generally at 10. Motor 10 is described below in greater detail. A plurality of magnetic read/write heads 12, usually one per disc surface, are mounted to an actuator 14. In the example shown at drive 2, actuator 14 is a rotatory actuator which is mounted for pivoting about a pivot axis 16. Actuator 14 includes a number of head mounting arms 18 which couple heads 12 to the actuator body via a plurality of load beam/gimbal assemblies 20. Actuator motor 22 is also coupled to actuator body 14 to provide a force to move heads 12 to a desired position on the surface of disc 8.

In operation, the spindle motor 10 causes disc 8 to rotate. Electronic circuitry 24 energizes actuator motor 22 causing actuator 14 to rotate about pivot 16 whereby magnetic read/write head 12 is moved through an arc radially across the surface of disc 8. Actuator 14 positions head 12 over a concentric track, for example track 26 of disc 8. This allows electronic circuitry 24 to read back or write information at desired locations on disc 8.

Figure 2:
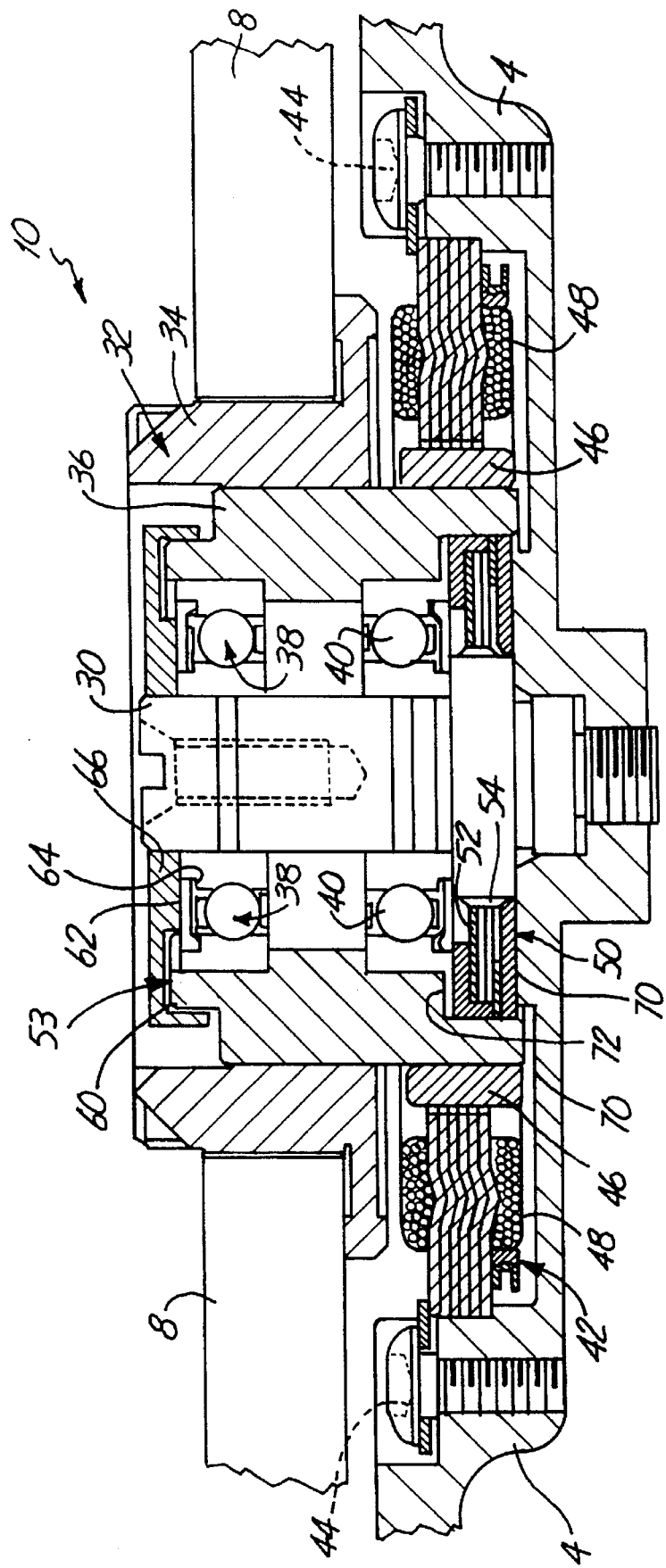
FIG. 2 is a cross-sectional view of a disc drive motor.

FIG. 2 shows spindle drive motor 10 of a fixed shaft design in cross section in accordance with one aspect of the invention. Drive motor 10 is mounted to base 4 and includes fixed shaft 30 which is screwed into base 4. Rotor hub 32 includes hub 34 and rotor 36 which rotate about fixed member 30 on upper bearing 38 and lower bearing 40. Hub 34 supports disc 8. Upper bearing 38 and lower bearing 40 are positioned between fixed shaft 30 and rotor 36 and rotatably couple rotor 36 to fixed shaft 30. Stator assembly 42 is mounted to base 4 by screws 44. Permanent magnets 46 are attached to rotor 36 proximate stator assembly 42. Electrical signals supplied to windings 48 of stator assembly 42 cause a magnetic field which interacts with permanent magnets 46 to cause rotor hub 32 to rotate.

Motor 10 includes ferrofluid seal 50 coupled to rotor 36. Ferrofluid seal 50 includes magnet assembly 52 and ferrofluid 54. Ferrofluid seal 50 is held in contact with the base of shaft 30 by magnet 52.

Disc 8 is contained in the sealed environment of the disc drive chassis formed by base 4 and cover 6. However, during operation, various contaminants from motor 10 tend to leak from motor 10 and enter the environment of disc 8. The illustration of FIG. 2 shows two techniques to reduce this leakage. Ferrofluid seal 50 provides a seal using ferrofluid 54. This tends to keep any contaminants such as metal particles or lubrication used with bearing 40 isolated from the environment of disc 8. Additionally, lubricants from bearing 38 which tend to enter the environment of disc 8 are blocked by labyrinth seal 53.

Particulate and fluid contaminants escaping from motor 10 and entering the contaminant-free environment of disc 8 is a concern in precision disc drives. Another source of contaminants is the ferrofluid 54 of ferrofluid seal 50. Design of disc drives is also influenced by the cost associated with the design and its application to high volume production. This has increasingly lead to simplification of the design and fewer parts while still demanding high performance. Ferrofluid seal 50 tends to be relatively expensive in comparison to the other parts of disc drive 2. Therefore, it has been desired to replace ferrofluid seals with a less expensive labyrinth seal. However, it has typically not been possible to replace all ferrofluid seals with labyrinth type seals. This is a particular problem at elevated temperatures, for example 70° C., where particles and fluid are more difficult to contain.

The present invention provides a technique to reduce escape of particulate and liquid contaminants from the motor of the disc drive into the sealed environment of the storage disc. The present invention includes coating critical surfaces in the motor with a material which tends to inhibit migration of the contaminants thereacross. One such material is a stable fluorocarbon polymer. Typically, such a polymer has a surface energy below the surface tension of the lubricating fluids, ferrofluids or other contaminants in the motor. This material has a characteristic that prevents wetting of the surface and creep of fluids across the surface of the material. However, contaminants may still travel across the surface of the material in instances where the contaminant has a particularly high volume or is under a great pressure. In one preferred embodiment, the barrier material comprises a polymer film known by the chemical name polydihydropentadecafloroctalmethylacrolate, sold under the trade name Nye Bar type K, which is available from Nye Lubricants at P.O. Box 8927, New Bedford, Mass. 02742-8927.

To seal materials generated in the vicinity of bearing 38 from entering the environment of disc 8 shown in FIG. 2, the barrier material is coated on surfaces proximate bearing 38. For example, barrier material 60 is deposited in labyrinth 52. Additionally, barrier material 62 is coated proximate race 64 of bearing 38 and material 66 is adhered to fixed member 30. Liquid from motor 10, such as lubricant from bearing 38, tends to bead up on the surface of barrier material 60 through 66 and will not easily flow past these barriers. This barrier acts as a trap for liquid and particulate contaminants. Further, the barrier material may act as a trap for outgas generated by materials in motor 10.

FIG. 2 also shows another aspect of the invention in which the barrier material is used to inhibit ferrofluid 54 from ferrofluid seal 50 from leaking from motor 10 into the sealed environment of storage disc 8. Barrier material 70 and 72 are deposited proximate ferrofluid seal 50. Barrier material 70 is deposited on base 4 below ferrofluid seal 50 and tends to prevent ferrofluid 54 from escaping from magnet 52 and entering the sealed environment of magnetic storage disc 8. Barrier material 72 is positioned on rotor 36 and tends to inhibit flow of ferrofluid 54 from permanent magnet 52 toward bearing 40 and the inner portion of motor 10. This design provides the sealing performance benefits of a ferrofluid seal yet reduces escape of ferrofluid from the seal.

Figure 3:
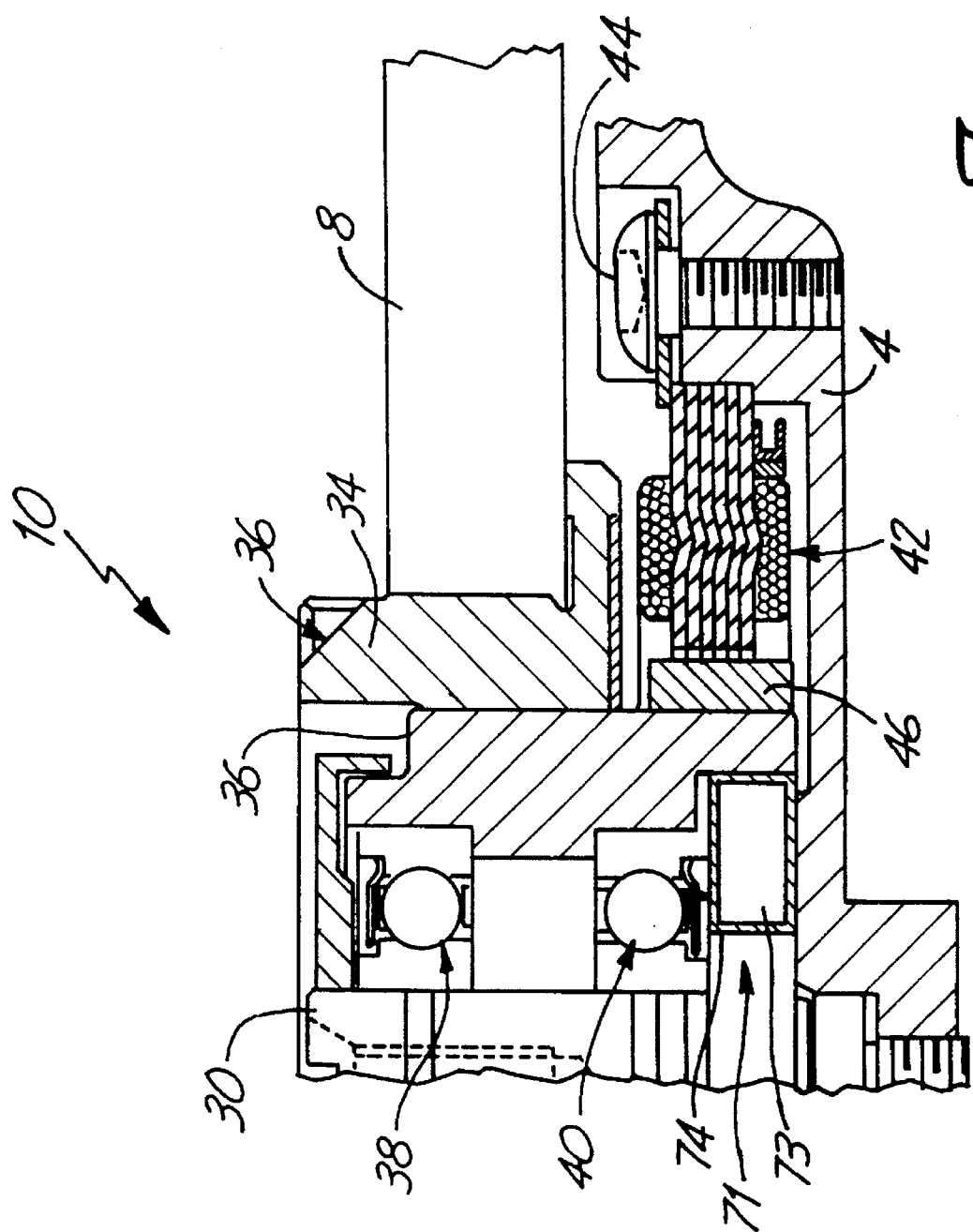
FIG. 3 is a cross-sectional view of another disc drive motor.

FIG. 3 shows another embodiment of the invention. Elements shown in FIG. 3 which are similar to elements shown in FIG. 1 and 2 are similarly numbered. In FIG. 3, a simple labyrinth disc seal 71 is shown proximate lower bearing 40. Seal 71 includes annular disc 73. Disc 73 is coated with the above described barrier material 74. Disc 73 is formed to fit snugly into base 4 between fixed member 30 and rotor 36, and provides a relatively small gap over a long path. The barrier material on disc 73 increases the effectiveness of simple labyrinth seal 71.

Figure 4A:
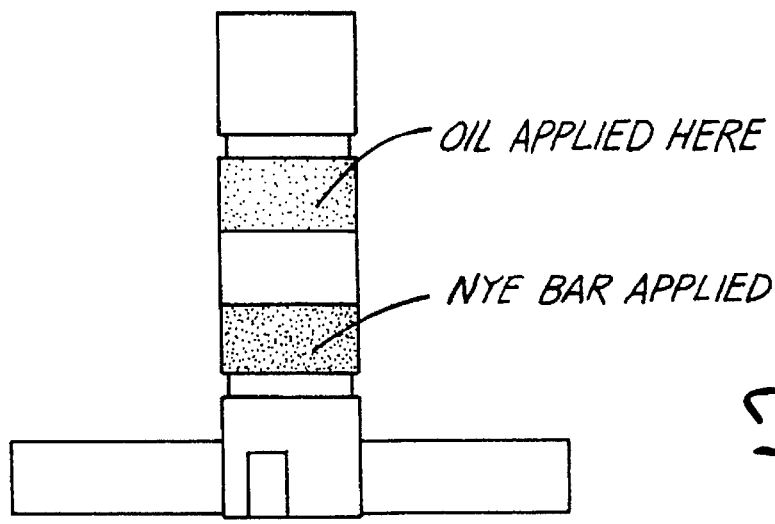
FIGS. 4A through 4C show three different test configurations used for testing the present invention.
Figure 4B:
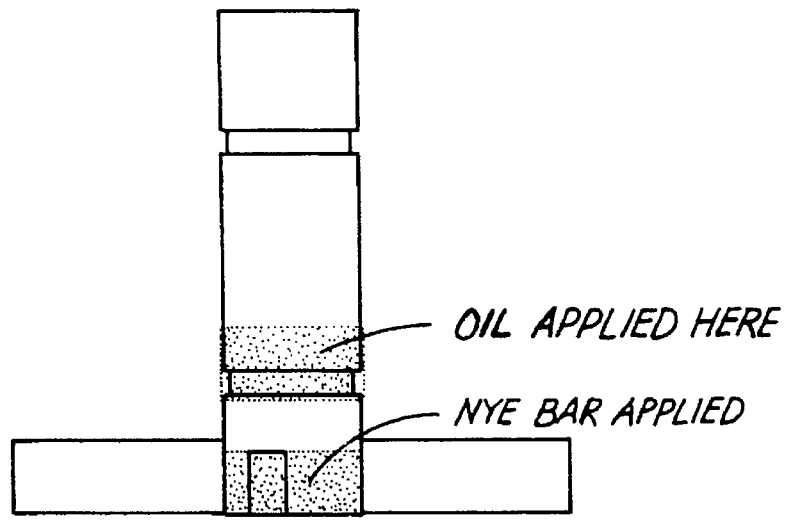
Figure 4C:
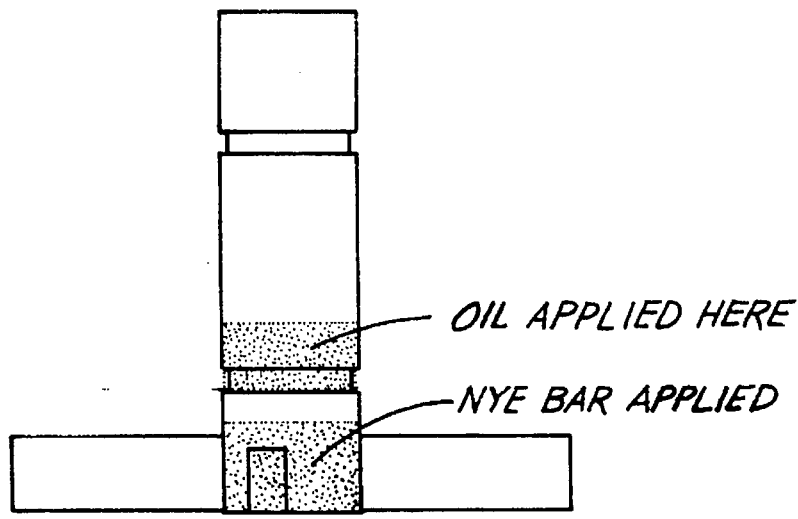

To test the effectiveness of Nye Bar-K, a number of tests were conducted. These are shown in FIGS. 4A, 4B and 4C. FIG. 4A shows Test 1. The parts were cleaned with alcohol. Nye Bar-K (0.2%) 74119-001 was applied around the shaft above the bearing groove. The parts were baked at 70° C. for 25 minutes to set the Nye Bar-K. An equivalent to undiluted bearing packing oil was applied around the shaft below the other bearing groove, leaving a gap between the oil and the Nye Bar. The assemblies were placed upside down in an oven set at 70° C.

FIG. 4B shows Test 2 which was the same as Test 1, except the Nye Bar-K was applied around the end of the shaft only to the depth of the slot, and in and around the inner diameter of the seal. The oil was applied around the bearing groove closest to the seal.

FIG. 4C shows Test 3 which was the same as Test 2, except the Nye Bar-K was applied around the end of the shaft above the depth of the slot to a height beyond the engagement of the seal onto the shaft.

The results of the test were as follows:

Test 1: After 86.5 hours, the Nye Bar continued to provide a barrier to migration of the oil down the shaft.

Test 2: Three assemblies leaked oil after 14.0 hours; two assemblies had no leakage after 62.5 hours.

Test 3: All five assemblies were nominal after 4.5 hours; four were still nominal after 46.5 hours. One assembly had leaked oil after 30.5 hours. A large amount of oil collected at one spot on the shaft, flowed down over the Nye Bar and onto the press fit junction. Capillary action wicked the oil through the press fit. In this case, the amount of oil was excessive for any comparison to bearing oil migration.

As shown by these tests, Nye Bar-K, when properly applied to the appropriate surfaces, can prevent bearing oil leakage through the press fit of the labyrinth seal onto the shaft, provided an excessive amount of oil is not present on the shaft.

Although the present invention has been described with reference to preferred embodiments, workers skilled in the art will recognize that changes may be made in form and detail without departing from the spirit and scope of the invention. For example, although the invention has been shown with reference to a fixed shaft under hub rotor design motor, the invention is not limited to this configuration. The invention may be employed with rotating shaft motors or inner hub rotor designs. Additionally, the barrier material may be applied to any appropriate location in which it is desirable to reduce contaminant flow therepast. Further, although the Nye Bar product is described, any material having appropriate barrier characteristics may be used as barrier material. The invention includes the use of barrier material on any or all effective interface surfaces where it is desirable to reduce contaminant flow thereacross.

What is claimed is:

1. A disc drive motor for use in a disc drive for storing information having a sealed disc drive chassis providing a substantially contaminant-free cavity, the disc drive motor comprising:

a fixed member coupled to the disc drive chassis;

a rotor rotatable about the fixed member for rotatably carrying a magnetic storage disc in the contaminant-free cavity, wherein one of the fixed member and the rotor comprises a shaft;

a bearing assembly between the rotor and the fixed member allowing rotation of the rotor relative to the fixed member;

a gap defined between the rotor and the fixed member which separates the bearing assembly from the magnetic storage disc and the contaminant-free cavity; and a barrier material carried on a surface in the gap having a characteristic which reduces contaminant flow from the region of the bearing assembly to the contaminant-free cavity.

2. The disc drive motor of claim 1 wherein the gap comprises a labyrinth seal.

3. The disc dive motor of claim 2 wherein the labyrinth seal comprises an annular disc coated with the barrier material fitted between the fixed member and the rotor.

4. The disc drive motor of claim 1 wherein the bearing assembly comprises a ball bearing assembly.

5. The disc drive motor of claim 1 wherein the fixed member comprises the shaft and the rotor includes a sleeve which rotates about the shaft on the bearing assembly.

6. The disc drive motor of claim 1 wherein the fixed member comprises a sleeve and the rotor includes the shaft which rotates in the sleeve about the bearing assembly.

7. The disc drive motor of claim 1 wherein the barrier material comprises a fluorocarbon polymer with a surface energy below a surface tension of a lubricant in the bearing assembly.

8. The disc drive motor of claim 1 including a ferrofluid seal proximate the gap whereby the barrier material inhibits the ferrofluid from flowing thereby.

9. The disc drive motor of claim 8 wherein the barrier material is located between the ferrofluid seal and the contaminant-free environment.

10. A magnetic storage system, comprising:

a sealed chassis providing a substantially contaminant-free environment;

a magnetic storage disc in the sealed chassis;

a magnetic transducer proximate the storage disc for reading and writing information on the disc;

a fixed member coupled to the chassis;

a rotatable member rotatable about the fixed member for carrying the magnetic storage disc in the substantially contaminant-free environment, wherein one of the fixed member and the rotatable member comprises a shaft;

a bearing assembly rotatably coupling the rotatable member to the fixed member;

a gap defined in surfaces of the rotatable member and the fixed member allowing rotation therebetween, wherein the gap defined in the surfaces comprises a labyrinth seal; and a barrier material carried on one of the surfaces which define the gap which reduces contaminant flow thereacross.

11. The magnetic storage system of claim 10 wherein the barrier material comprises a fluorocarbon polymer.

12. The magnetic storage system of claim 10 wherein the labyrinth seal is formed by an annular disc between the rotating member and the fixed member.

13. The magnetic storage system of claim 10 including a ferrofluid seal proximate the gap.

14. The magnetic storage system of claim 13 including barrier material adhered to surfaces proximate the ferrofluid seal between the ferrofluid seal and the bearing assembly.

15. The magnetic storage system of claim 10 wherein the fixed member comprises the shaft.

16. The magnetic storage system of claim 10 wherein the bearing assembly includes ball bearings and races which carry the ball bearings.

17. A disc drive motor for use in a disc drive for storing information having a sealed disc drive chassis providing a substantially contaminant-free cavity, the disc drive motor comprising:

a fixed member coupled to the disc drive chassis;

a rotor rotatable about the fixed member for rotatably carrying a magnetic storage disc in the contaminant-free cavity, wherein one of the fixed member and the rotor comprise a shaft;

a ferrofluid seal including a ferrofluid between the fixed member and the rotor; and barrier material proximate the ferrofluid seal positioned for reducing ferrofluid flow therepast.

18. The disc drive motor of claim 17 wherein the barrier material comprises a fluorocarbon polymer with a surface energy below a surface tension of the ferrofluid.

19. The disc drive motor of claim 17 wherein the barrier material is placed between the ferrofluid seal and the contaminant-free cavity.

20. The disc drive motor of claim 17 wherein the barrier material is positioned between the ferrofluid seal and an inner portion of the disc drive motor.

* * * * *